US008730506B2

(12) United States Patent
Kato

(10) Patent No.: US 8,730,506 B2
(45) Date of Patent: May 20, 2014

(54) IMAGE FORMING APPARATUS THAT CAN REQUEST ENDING TIME FOR PROCESSING PRINT DATA BY AN EXTERNAL APPARATUS FROM THE EXTERNAL APPARATUS AND CONTROL METHOD THEREOF

(75) Inventor: Kota Kato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 13/366,116

(22) Filed: Feb. 3, 2012

(65) Prior Publication Data
US 2012/0200888 A1 Aug. 9, 2012

(30) Foreign Application Priority Data
Feb. 8, 2011 (JP) ................................. 2011-024517

(51) Int. Cl.
*G06F 3/12* (2006.01)
(52) U.S. Cl.
USPC .......................... 358/1.15; 358/1.13; 358/1.14
(58) Field of Classification Search
USPC ............................................... 358/1.13–1.15
See application file for complete search history.

(56) References Cited

U.S. PATENT DOCUMENTS

| 7,352,980 | B2 * | 4/2008 | Kato et al. ...................... 399/80 |
| 2004/0012797 | A1 * | 1/2004 | Letellier .......................... 358/1.9 |
| 2005/0108069 | A1 * | 5/2005 | Shiran et al. ....................... 705/5 |
| 2005/0179930 | A1 * | 8/2005 | Doi et al. ...................... 358/1.14 |
| 2007/0008577 | A1 * | 1/2007 | Matsuura et al. ............. 358/1.15 |
| 2007/0070376 | A1 * | 3/2007 | Owen et al. ................... 358/1.13 |
| 2007/0165266 | A1 * | 7/2007 | Tian .............................. 358/1.15 |
| 2008/0158574 | A1 * | 7/2008 | Sugiyama ...................... 358/1.1 |
| 2008/0307113 | A1 * | 12/2008 | Suga ............................. 709/246 |
| 2009/0109485 | A1 * | 4/2009 | Yoshida ........................ 358/1.15 |
| 2011/0128579 | A1 * | 6/2011 | Igarashi et al. .............. 358/1.15 |
| 2011/0179257 | A1 * | 7/2011 | Shinoda ........................ 712/220 |

FOREIGN PATENT DOCUMENTS

JP 2003-288336 A 10/2003

* cited by examiner

*Primary Examiner* — Benny Q Tieu
*Assistant Examiner* — Quyen V Ngo
(74) *Attorney, Agent, or Firm* — Canon U.S.A., Inc., IP Division

(57) ABSTRACT

A printer transfers print data received from a host computer to a cloud server, requests a response, from the cloud server, indicating an ending time period when the cloud server processes the print data, receives the response indicating the ending time period returned from the cloud server, and shifts the printer to a sleep state during the ending time period. After the printer returns from the sleep state when the ending time period has elapsed, the printer requests processed data from the cloud server, receives the processed data returned therefrom, and performs print processing on the processed data.

9 Claims, 7 Drawing Sheets

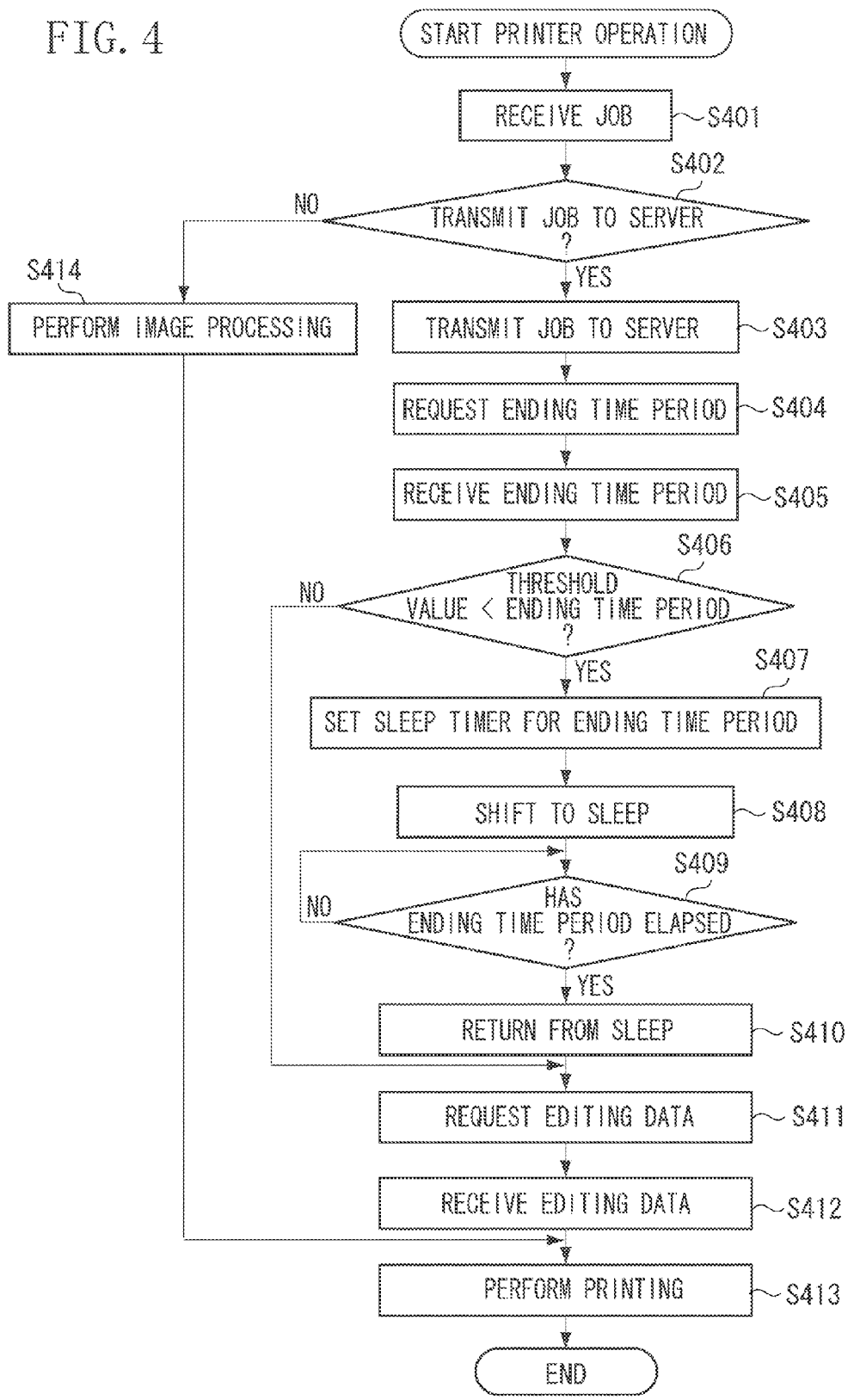

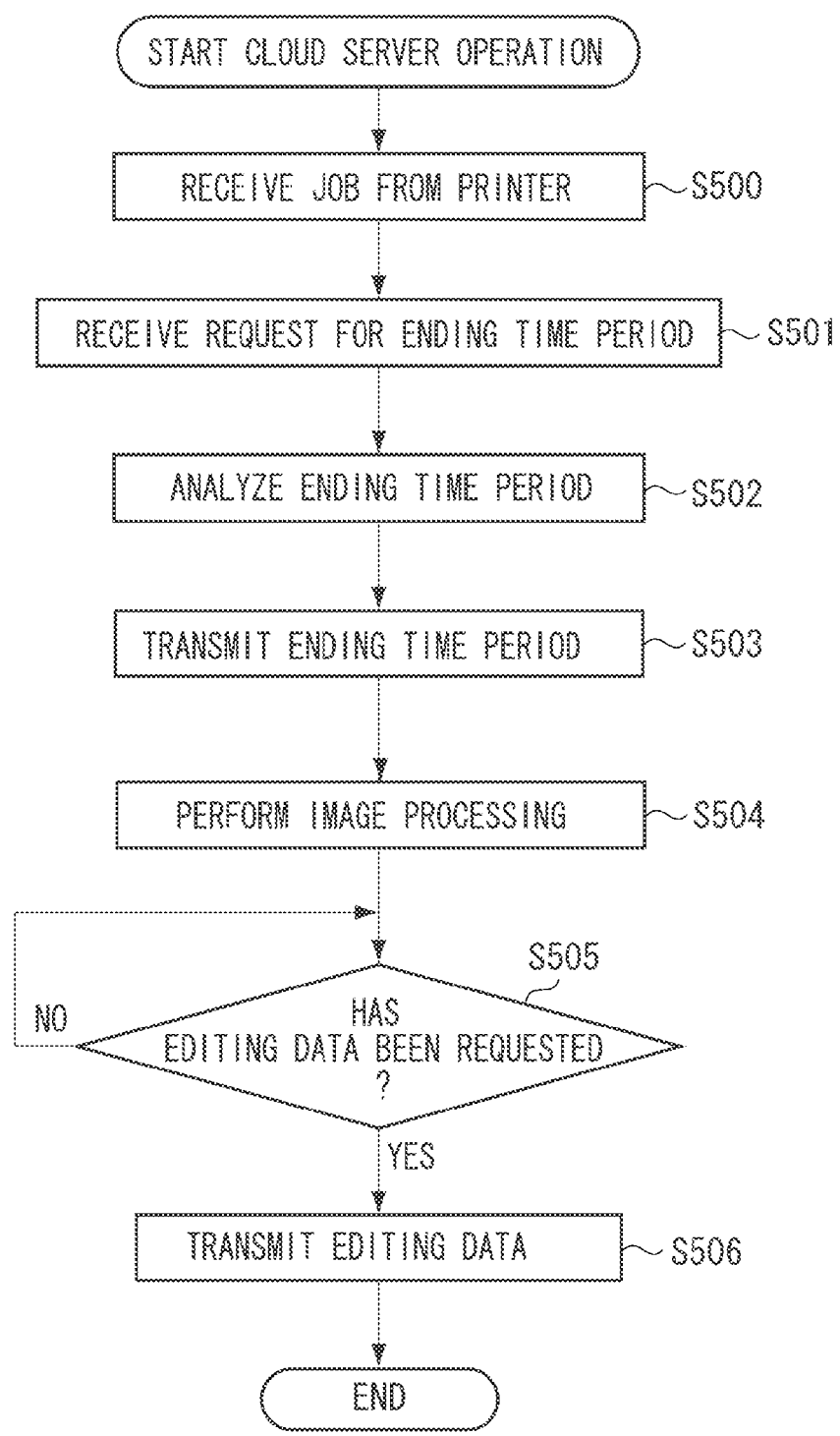

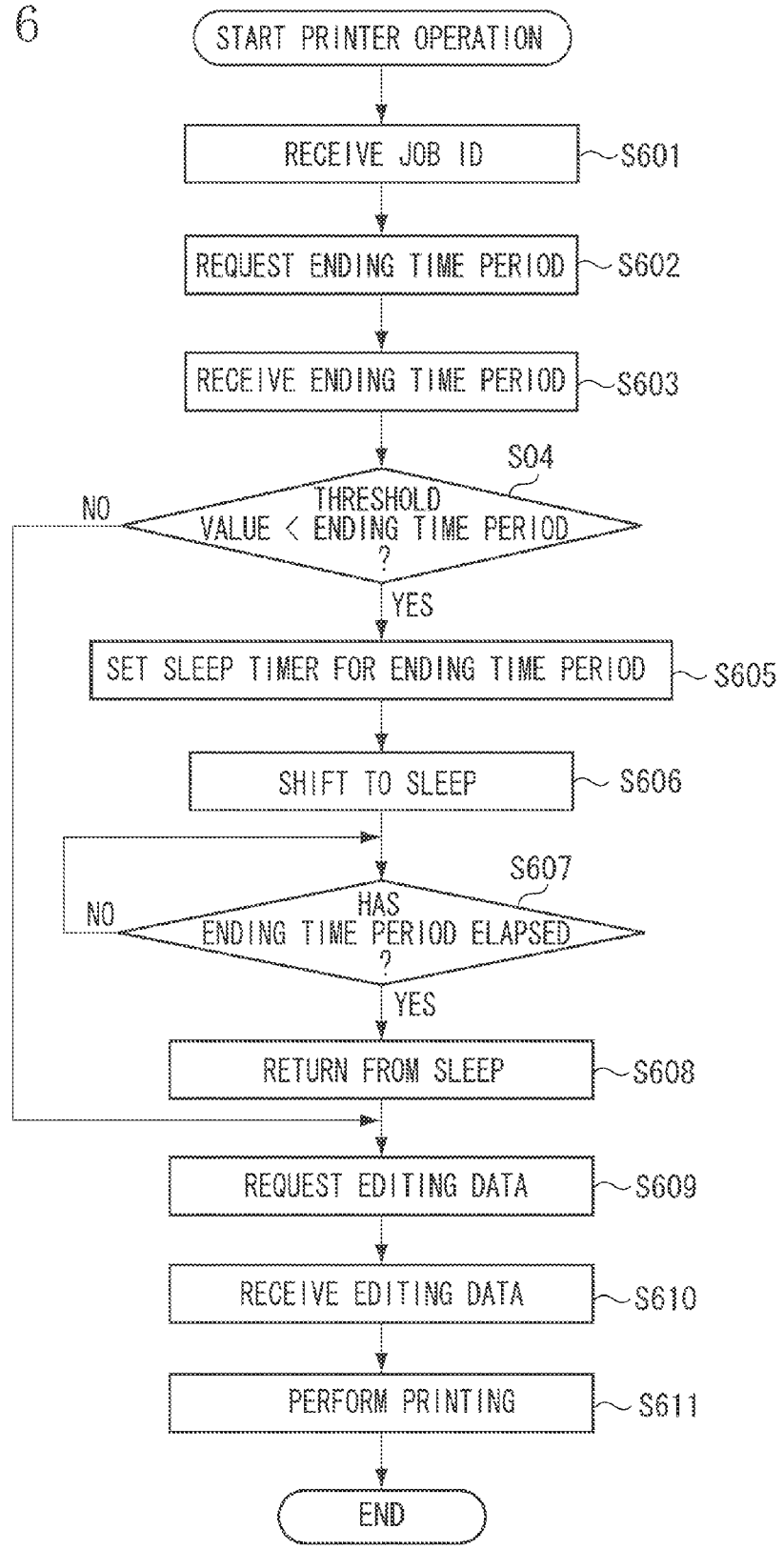

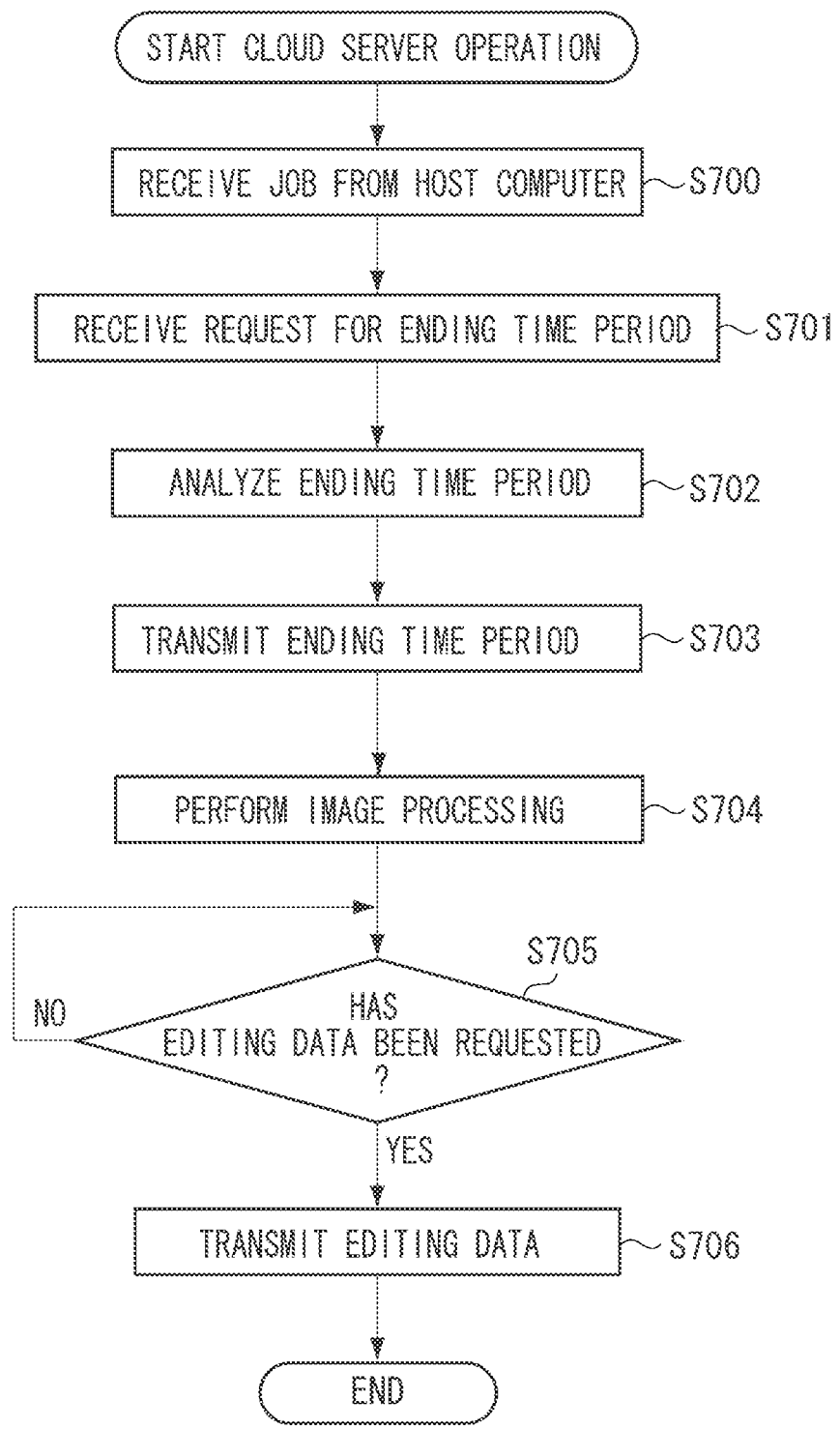

IMAGE FORMING APPARATUS THAT CAN REQUEST ENDING TIME FOR PROCESSING PRINT DATA BY AN EXTERNAL APPARATUS FROM THE EXTERNAL APPARATUS AND CONTROL METHOD THEREOF

BACKGROUND OF THE INVENTION

1. Field of the Invention

The present invention relates to an image forming apparatus that is capable of communicating with an external apparatus via a network, and a control method thereof.

2. Description of the Related Art

In recent years, a technique of cloud computing has been spreading that does not execute an application with a user's server but uses software in the form of a service provided on the internet.

The cloud computing features a service provision for a user's request without the user knowing where a program is actually executed. In a cloud computing environment, the user can advantageously reduce an initial investment for installing a server or purchasing an application.

This cloud computing environment is considered to be applied to a printer or a multifunction peripheral (MFP) capable of copying, printing, scanning, and faxing. In this case, the printer or the MFP supports a basic function, while the "cloud" on the network performs processing of an additional function, to establish a service environment for providing a low-cost MFP body or printer body, and also a high-performance added value.

As an example of a combination between the printer and the cloud, Japanese Patent Application Laid-Open No. 2003-288336 discusses a technique in which the cloud processes a function (e.g., an aggregate copy function that needs a great memory capacity, such as N-in-1) which an inexpensive printer does not deal with, and the printer performs printing. With this technique, since a printer side does not need extension but the cloud performs the processing, the printer can be reduced in its cost.

In addition, functions prospective using the cloud include Page Description Language (PDL) processing, synthetic printing by adding a bar code/copy-forgery-inhibited pattern, optical character recognition (OCR), and voice conversion.

On the other hand, reducing a consumption of electric power is an essential theme for the MFP, which can be achieved by positively reducing electric power while the MFP is not in use.

Further, generally, a cloud server is set up prior to an installation of a firewall. More specifically, a local area networks (LAN) to which the MFP is to be connected may have been provided with the firewall. In such a case, the cloud server cannot transmit a packet to the MFP as a transmission source. However, a packet can be transmitted from the MFP to the cloud server, and a response packet can be returned from the cloud server to the MFP, which is the transmission source.

By adding contents to be conveyed to the response packet, information can be transmitted from the cloud server to the MFP. More specifically, only one method for the MFP to realize receiving an image of a processing result from the cloud server is to transmit the packet (polling packet) to the cloud server and receive the response packet therefrom.

When the MFP transmits the above-described processing (referred to as a "job") to the cloud server, a job (preceding job) from another device may already have been transmitted to a cloud server side. When a great number of jobs, a great number of pages, or a great amount of processing of the preceding jobs has been transmitted (when the cloud side is crowded), it takes time until the processing result corresponding to the job transmitted by the MFP itself is returned from the cloud server. In such a case, until the processing result is returned, the MFP continues transmitting a polling packet to the cloud server. As a result, a problem that the MFP consumes wasteful electric power arises. Further, since the MFP continues transmitting the polling packet until the processing result is returned, a load for communicating with the cloud server is increased accordingly.

SUMMARY OF THE INVENTION

One aspect of the present invention is directed to a method in which an MFP can shift to sleep (power saving state) even when a processing result of a print job is not returned from a cloud server at once, thereby reducing consumption of wasteful electric power and a load for communicating with the cloud server.

According to an aspect of the present invention, an image forming apparatus configured to communicate with an external apparatus via a network includes a reception unit configured to receive print data, a transfer unit configured to transfer the received print data to the external apparatus, an ending time period reception unit configured to request information, from the external apparatus, indicating an ending time period when the external apparatus processes the transferred print data and to receive the information indicating the ending time period from the external apparatus in response to the request, a processed data reception unit configured to request processed data from the external apparatus after the ending time period has elapsed and to receive the processed data returned from the external apparatus in response to the request, and a printing unit configured to print the processed data.

According to an exemplary embodiment of the present invention, an image forming apparatus can shift to sleep (power saving state) even when the processing result of the print job is not returned from an external apparatus at once, thereby reducing a consumption of wasteful electric power and a load for communicating with the cloud server.

Further, features of the present invention will be apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 4 is a flowchart illustrating an example of processing by a printer according to the first exemplary embodiment.

FIG. 5 is a flowchart illustrating an example of processing by a cloud server according to the first exemplary embodiment.

FIG. 6 is a flowchart illustrating an example of processing by a printer according to a second exemplary embodiment.

FIG. 7 is a flowchart illustrating an example of processing by a cloud server according to the second exemplary embodiment.

DESCRIPTION OF THE EMBODIMENTS

Various exemplary embodiments, features, and aspects of the invention will be described in detail below with reference to the drawings.

Figure 1:
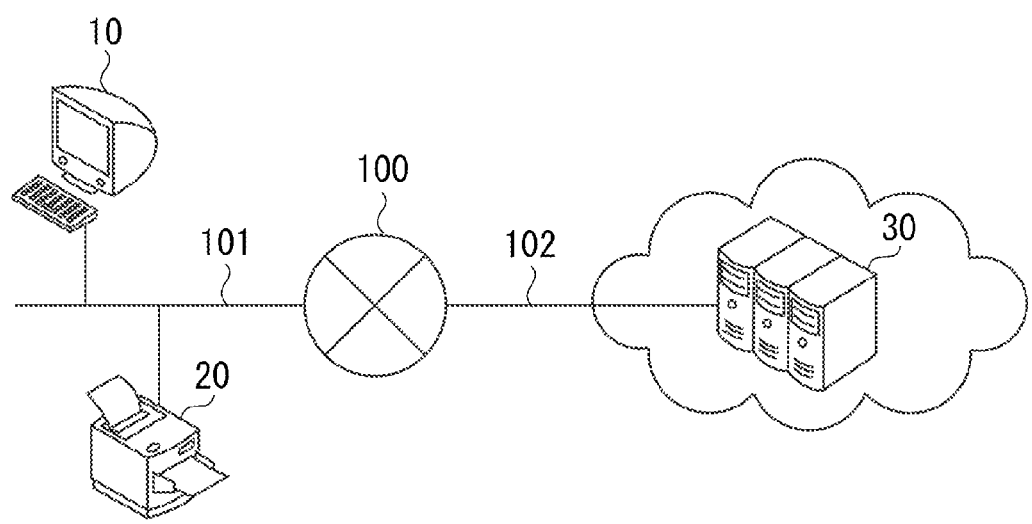
FIG. 1 illustrates an example of a system configuration according to a first exemplary embodiment.

FIG. 1 is a configuration diagram of an image processing system illustrating an example of a system configuration according to a first exemplary embodiment.

In FIG. 1, a cloud server 30 (an external apparatus), which is connected to a network 102, performs processing for receiving a job including print data from a host computer 10 or a printer 20, and processing according to settings specified by the job. In an image processing system according to the present exemplary embodiment, the printer 20 and the cloud server 30 cooperate with each other to perform a print job. The cloud server 30 includes one or more server computers. Further, the printer 20 has an energy-saving mode (also referred to as a "power-saving mode" or a "sleep mode"). Other image forming apparatuses such as an MFP may be used as the printer 20.

The host computer 10 and the printer 20 in a user environment are connected to each other via a local area network (LAN) 101, and the user environment and the cloud server 30 are connected to each other via the internet 100, to form a print system (an image processing system). The LAN 101 includes a firewall, and thus the cloud server 30 cannot transmit a packet to the host computer 10 or the personal computer (PC) 20 as a transmission source.

A flow of data when cloud is used according to the present exemplary embodiment will be described below.

There are variety of flows of the data when the cloud is used. One of the flows is by means of a method (hereinafter, referred to as an indirect usage method) for transferring a job from the host computer 10 to the printer 20 by a user's instruction, determining necessity of the processing by the cloud at a printer 20 side, and transferring the job to the cloud server 30 as necessary. In the indirect usage method, the job transferred to the cloud server 30 is processed by the cloud server 30. Subsequently, as a response to a polling packet from the printer 20, the job is transferred to the printer 20 again, and then printed by the printer 20.

Another one is by means of a method (hereinafter, referred to as a direct usage method) for transmitting a job, in which a printer to perform printing is instructed, from the host computer 10 to the cloud server 30 by a user's instruction. In this direct usage method, the job transmitted to the cloud is processed by the cloud server 30. Subsequently, as a response to a polling packet from the printer 20, the job is transferred to the printer 20 and printed thereby.

In the first exemplary embodiment, a case where the "indirect usage method" is used as a utilization form of the cloud will be described. Further, in a second exemplary embodiment described below, a case where the "direct usage method" is used as a utilization form of the cloud will be described. In either exemplary embodiment, regarding processing performed by the cloud, an aggregate printing function such as N-in-1 will be described as an example, but, the processing performed by the cloud is not limited thereto.

Figure 2:
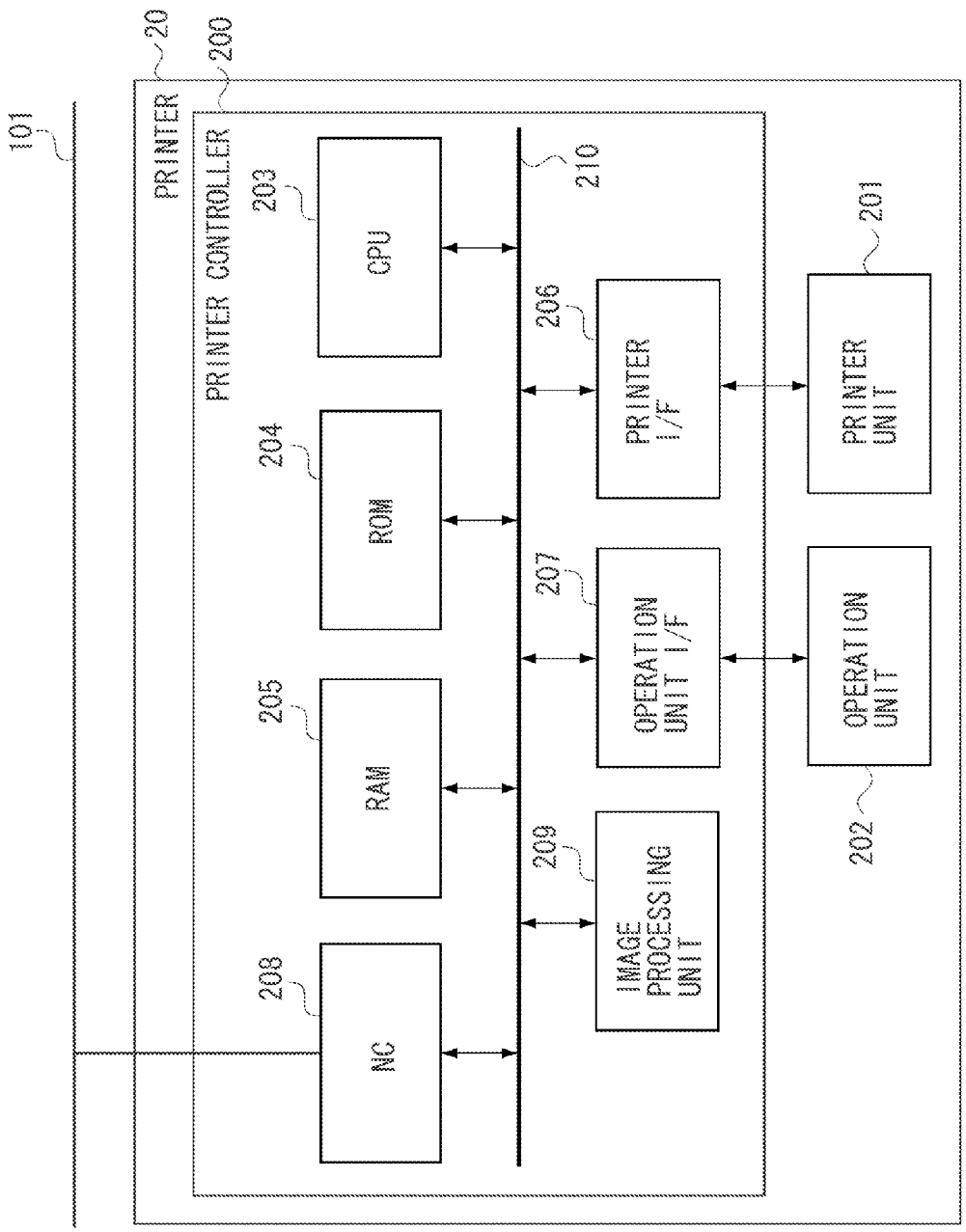
FIG. 2 is a block diagram illustrating an example of a configuration of a printer.

FIG. 2 is a block diagram illustrating an example of a configuration of the printer 20.

In FIG. 2, a printer controller 200 is connected to a printer unit 201, which is an image output device. The printer controller 200 controls communication with a LAN 101 via a network controller (NC) 208.

In the printer controller 200, a central processing unit (CPU) 203 controls an entire system by reading and executing a program computer-readably recorded in a read-only memory (ROM) 204. Further, the CPU 203 also controls the printer 20 to shift to sleep (shift to a power-saving state) and return from sleep (return from the power-saving state).

The ROM 204 is a boot ROM, and stores a boot program of the system.

A random access memory (RAM) 205 is a system work memory for the CPU 203 to operate, and is also an image memory for temporarily storing image data such as print data transmitted from the host computer 10 and the cloud server 30.

A printer interface (I/F) 206 is connected to the printer unit 201, and communicates with the CPU 203 of the printer unit 201. The printer unit 201 performs printing on a sheet based on the image data received from the printer I/F 206.

An operation unit I/F 207 is an interface portion with the operation unit 202, and transmits information input by the user from the operation unit 202 to the CPU 203.

An image processing unit 209 performs image processing on the print job transmitted from the host computer 10. A system bus 210 is connected to each module.

Figure 3:
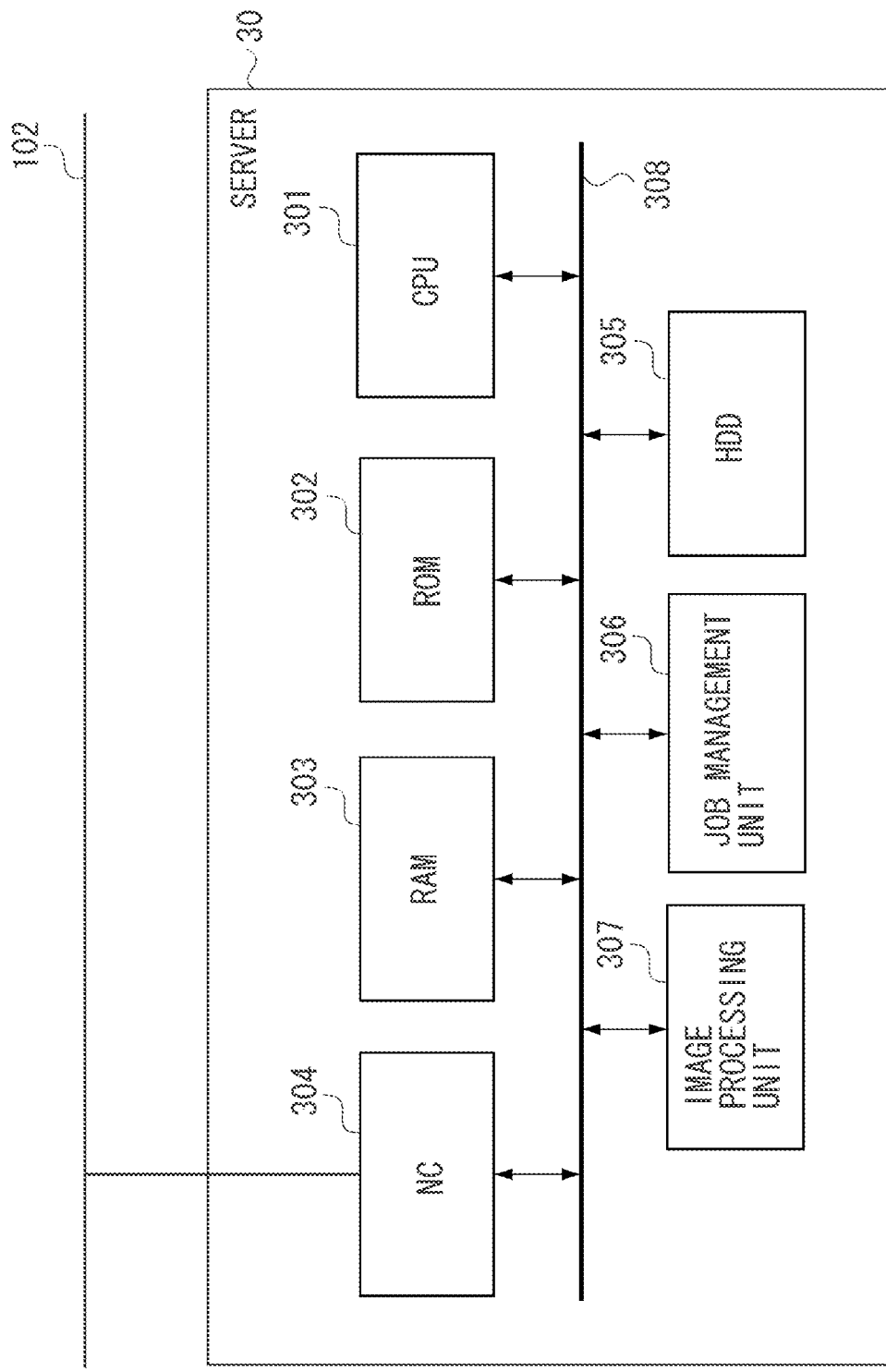
FIG. 3 is a block diagram illustrating an example of a configuration of a cloud server.

FIG. 3 is a block diagram illustrating an example of a configuration of the cloud server 30.

In FIG. 3, a CPU 301 operates as a controller entirely controlling the cloud server 30.

A ROM 302 is a boot ROM, and stores a boot program of the system.

A RAM 303 is a system work memory for the CPU 301 to operate, and is also an image memory for temporarily storing image data such as print data transmitted from the printer 20.

An NC 304 controls communication with the network 102.

A hardware disk (HDD) 305 stores an operating system program, an application program, a receiving job, and an editing job.

A job management unit 306 manages jobs in order of receiving them together with the number of pages, a processing type, and an estimated processing time of the job. The CPU 301 calculates the processing time from information about the number of pages and the processing type (details will be described below).

An image processing unit 307 performs the image processing on the job transmitted from the printer 20. A system bus 308 is connected to each module.

The job management unit 306 and the image processing unit 307 may be hardware or a software module that can be realized when the CPU 301 reads and executes a program computer-readably recorded in the HDD 305.

In the present exemplary embodiment, an example in which one cloud server 30 provides the printer 20 with the cloud service is described. However, another embodiment may include a plurality of cloud servers among which a plurality of virtual machines may be activated to perform distributed processing. In this case, a technique referred to as a scale out, in which the number of virtual machines is increased according to a predetermined condition, is used.

Herebelow, the processing according to the first exemplary embodiment will be described with reference to flowcharts illustrated in FIGS. 4 and 5. According to the first exemplary embodiment, the printing is performed by the indirect usage method, and the host computer 10 transmits the print job with a print job identification (ID) to the printer 20. The print job ID is added to the print job when the host computer 10 generates the print job, and is an identifier for identifying the print job. The printer 20 according to the present exemplary embodiment will be described assuming that it does not deal with the aggregate printing function of N-in-1.

FIG. 4 is a flowchart illustrating an example of processing by the printer 20 according to the first exemplary embodiment.

The processing illustrated by the flowchart in FIG. 4 can be realized when the CPU 203 of the printer controller 200 of the printer 20 reads and executes the program computer-readably recorded in the ROM 204.

In step S401, upon reception of the print job with the print job ID from the host computer 10 via the LAN 101 and the NC 208, the CPU 203 of the printer 20 stores the print job in the RAM 205, and then proceeds to step S402. It is assumed that this print job processes four pages and the aggregate printing of 4-in-1.

In step S402, the CPU 203 determines whether its own printer 20 can process the print job received in step S401 described above, to determine whether to transfer the print job to the cloud server 30 (print job determination processing).

When it is determined not to transferred the print job to the cloud server 30 (NO in step S402), the CPU 203 proceeds to step S414.

On the other hand, when it is determined to transfer the print job to the cloud server 30 (YES in step S402), the CPU 203 proceeds to step S403. For example, when the received job is the print job in which the aggregate printing of 4-in-1 is set and the printer 20 does not deal with the aggregate printing of N-in-1, the CPU 203 determines to transfer the print job to the cloud server 30.

In step S403, the CPU 203 transfers the print job stored in the RAM 205 to the cloud server 30 via the NC 208 and the LAN 101. At this point, the print job ID is also transmitted.

In step S404, in order to know the time period for ending the job corresponding to the above-described print job ID on the cloud server 30, the CPU 203 transmits a request packet for an ending time period (including above-described print job ID) to the cloud server 30 via the NC 208 and the LAN 101.

In step S405, the CPU 203 receives information about the ending time period of the job from the cloud server 30 via the LAN 101 and the NC 208 in a form of the response packet to the above-described request packet for the ending time period, and then stores the information in the RAM 205 (ending time period acquisition processing). Herein, it is assumed that "15 minutes" is received as an ending time period. A method in which the cloud server 30 calculates the ending time period will be described below.

In step S406, the CPU 203 compares a threshold value that has been previously set with the ending time period stored in the RAM 205 in step S405 described above, to determine whether the ending time period is larger than the threshold value (threshold value<ending time period). The threshold value refers to a value for determining how many minutes the printer 20 waits until the printer 20 itself shifts to sleep (power-saving state) after the printer 20 has transmitted the job to the cloud server 30. This threshold value has been previously set and stored in an Erasable Programmable Read Only Memory (EPROM) region in the ROM 204. This threshold value can be changed from the operation unit 202 or the host computer 10 by a manager of the printer 20. Herein, as an example, the threshold value is assumed as "1 minute" for descriptions.

When it is determined that the ending time period is not larger than the threshold value (threshold value≥ending time period) (NO in step S406), the processing proceeds to step S411.

On the other hand, when it is determined that the ending time period is larger than the threshold value (threshold value<ending time period) (YES in step S406), the processing proceeds to step S407. According to the above-described example, since the ending time period (15 minutes) is larger than the threshold value (1 minute), the processing proceeds to step S407.

In step S407, the CPU 203 sets the sleep timer for a value of the ending time period of the job stored in the RAM 205 in step S405 described above. The sleep timer is a timer for returning from sleep after the set time has elapsed, and is included in the CPU 203, but, it may be a single-unit module in the printer controller 200.

In step S408, the CPU 203 executes sleep shift processing for shifting the printer 20 to the sleep state to start the sleep mode. At this time, a power supply of the printer 20 is reduced as much as possible to realize the power saving.

The CPU 203 may notify the host computer 10 of the ending time period of the job before executing the sleep shifting processing (ending time period notification processing). With this processing, the host computer 10 can display the ending time period of the job on a screen to notify the user of the ending time period.

In step S409, it is monitored whether the time period set for the sleep timer in the CPU 203 has elapsed, and after the time period has elapsed, the processing proceeds to step S410.

In step S410, the CPU 203 returns from the sleep mode, and proceeds to step S411.

In step S411, the CPU 203 executes processing for transmitting to the cloud server 30 the request packet for editing data. More specifically, the CPU 203 first executes polling on the cloud server 30 via the NC 208 and the LAN 101 to confirm that the print job has been completed, and the CPU 203 transmits the request packet for the editing data to the cloud server 30.

In step S412, the CPU 203 receives the editing data from the cloud server 30 via the LAN 101 and the NC 208 in the form of the response packet, stores the editing data in the RAM 205 (processed data acquisition processing), and then proceeds to step S413.

In step S413, the CPU 203 transmits the editing data stored in the RAM 205 to the printer unit 201 via the printer I/F 206, and causes the printer unit 201 to perform the print processing. Subsequently, the processing of this flowchart is ended.

When it is determined that the print job is not transferred to the cloud server 30 (NO in step S402), the CPU 203 proceeds to step S414. In step S414, the CPU 203 causes the image processing unit 209 to perform the image processing to generate the editing data. Subsequently, in step S413, the CPU 203 transmits the editing data generated by the image processing to the printer unit 201 via the printer I/F 206, and then causes the printer unit 201 to perform the print processing. Subsequently, the processing of this flowchart is ended.

During the sleep corresponding to the ending time period of the job (hereinafter, referred to as a "first print job") in step S409 described above, when the printer 20 receives a new job (hereinafter, referred to as a "second job") by the NC 208, the CPU 203 returns from the sleep mode and transmits the second print job to the cloud server 30.

Further, the CPU 203 controls the first print job to perform the processing in steps S404 to S413 again. In other words, the CPU 203 transmits to the cloud server 30 the request packet for the ending time period of the first print job to acquire the ending time period of the first print job again, and then receives information about the ending time period of the first print job from the cloud server 30 again. When the CPU 203 determines that the threshold value is equal to or larger than the ending time period, the CPU 203 performs the processing in steps S411 to S413.

On the other hand, when the CPU 203 determines that the ending time period is larger than the threshold value, the CPU 203 sets the sleep timer for the value of the ending time period, and performs the sleep shift processing to start the sleep mode. After the ending time period has elapsed, the CPU 203 returns from the sleep mode, and executes the processing of steps S411 to S413. Upon completion of the printing of the first print job in step S413, the CPU 203 controls the second print job to perform the processing in steps S404 to S413.

According to the descriptions above, the ending time period of the first print job is acquired again, but may not be acquired as described below.

When the second print job is received by the NC 208 during the sleep corresponding to the first print job, the CPU 203 returns from the sleep mode, and transmits the second print job to the cloud server 30. Further, the CPU 203 calculates a remaining time until an original ending time period of the first print job, and controls execution of the processing in steps S406 to S413 adopting the calculated remaining time as a new ending time period of the first print job. Upon the completion of the printing of the first print job in step S413, the CPU 203 controls the second print job to perform the processing in steps S404 to step S413.

With the configuration described above, even when a new print job is received during the sleep, the printer 20 can realize both of an efficient processing of the print job and the power saving. In addition, by transmitting the polling packet from the printer 20 to the cloud server 30 after the ending time period has elapsed, the load for communicating with the cloud server 30 can be reduced.

The processing at the cloud server 30 side will be described. FIG. 5 is a flowchart illustrating an example of the processing by the cloud server 30 according to the first exemplary embodiment.

The processing illustrated in the flowchart in FIG. 5 can be realized when the CPU 301 of the cloud server 30 reads and executes the program computer-readably stored in the HDD 305.

In step S500, upon the reception of the print job with the print job ID from the printer 20 via the LAN 101 and the NC 304, the CPU 301 of the cloud server 30 stores the print job with the print job ID in the RAM 303 (or, HDD 305), and then proceeds to step S501. The print job stored in the RAM 303 (or, HDD 305) is managed by the job management unit 306 together with the print job ID, the number of pages, the processing type, and the estimated processing time.

In step S501, upon reception of the request packet for the ending time period from the printer 20 via the network 102 and the NC 304, the CPU 301 proceeds to step S502.

In step S502, the CPU 301 analyzes the ending time period based on the number of jobs of the print job, the number of pages of the job, and the processing type of the job stored in the RAM 303 (or, HDD 305) (ending time period calculation processing).

As an example, it is assumed that, as preceding jobs, a first job of 200 pages/page description language (PDL), a second job of 40 pages/copy-forgery-inhibited pattern, a third job of 10 pages/OCR are managed by the job management unit 306 (the job is described in a format of the number of pages/job type). And, it is assumed that a job received in step S500 is additionally registered as a fourth job of 20 pages/4-in-1. It is assumed that the job management unit 306 performs management such that, every time the page of the job is processed, the number of pages of the job under management is subtracted.

The estimated processing time of each job is uniquely decided by the number of pages and processing contents. The HDD 305 of the cloud server 30 previously retains the estimated processing time per page for processing as a fixed value depending on each job type.

For example, fixed values are retained as follows: PDL processing, estimated processing time per page: 3 seconds/page;
Copy-forgery-inhibited pattern processing, estimated processing time per page: 6 seconds/page;
OCR processing, estimated processing time per page: 3 seconds/page; and
4-in-1 processing, estimated processing time per page: 1.5 seconds/page.

The CPU 301 multiplies the estimated processing time per page by the number of pages of the job to calculate the estimated processing time of each job. Details will be described below:

Estimated processing time of the first job (200 pages/PDL)=200 (pages)×3 (seconds/page)=600 (seconds)=10 (minutes);

Estimated processing time of the second job (40 pages/copy-forgery-inhibited pattern)=40 (pages)×6 (seconds/page)=240 (seconds)=4 (minutes);

Estimated processing time of the third job (10 pages/OCR)=10 (pages)×3 (seconds/page)=30 (seconds)=0.5 (minutes); and Estimated processing time of the fourth job (20 pages/4-in-1)=20 (pages)×1.5 (seconds/page)=30 (seconds)=0.5 (minutes).

In other words, the estimated processing time of the first job is calculated to be 10 minutes, that of the second job is calculated to be 4 minutes, that of the third job is calculated to be 0.5 minutes, and that of the fourth job is calculated to be 0.5 minutes.

Further, it is understood that "job ending time period=total of estimated processing times of respective jobs from a first job to a current job managed by the job management unit 306". According to the above-described example, it is acquired that "ending time period of fourth job=10+4+0.5+0.5=15 (minutes)". Therefore, the CPU 301 sets as the ending time period the value acquired by totaling the estimated processing times of respective jobs from the first job to the current job managed by the job management unit 306 (according to the above-described example, ending time period=15 minutes), and stores the value in the RAM 303.

In step S503, the CPU 301 transmits the ending time period stored in the RAM 303 to the printer 20 via the NC 304 and the network 102.

Upon completion of the processing of the preceding job, in step S504, the CPU 301 causes the image processing unit 307 to perform the image processing on the job received in step S500 described above and managed by the job management unit 306. Subsequently, the image processing result (editing data) is stored in the RAM 303 (or, HDD 305).

In step S505, the CPU 301 determines whether the editing data is requested from the printer 20 via the network 102. When the editing data is requested (YES in step S505), the processing proceeds to step S506.

In step S506, the CPU 301 reads the editing data (processed data) corresponding to the job ID requested in step S505 described above from the RAM 303 (or, HDD 305), and transmits the editing data to the printer 20 via the network 102 and the NC 304 (processed data transmission processing). Subsequently, the processing of this flowchart is ended.

As described above, according to the present exemplary embodiment, even when the processing result is not returned at once from the cloud server 30, the image forming apparatus (printer 20) can shift to sleep, thereby reducing a consumption of wasteful electric power. In addition, the image forming apparatus (printer 20) does not wastefully transmit a polling packet to the cloud server 30, thereby reducing a load for communicating with the cloud server 30.

The first exemplary embodiment described above describes the "indirect usage method" used as the utilization form of the cloud. A second exemplary embodiment will describe the "direct usage method" used as the utilization form of the cloud.

In the direct usage method, the host computer 10 transmits the print job and the print job ID to the cloud server 30, and transmits the print job ID to the printer 20. The cloud server 30 that has received the print job and the print job ID transfers the editing data to the printer 20 in the form of a response packet in response to the request for the editing data associated with the print job ID from the printer 20. The printer 20 prints and outputs the editing data received from the cloud server 30.

Since the printer 20 and the server 30 have the same configurations as those in FIGS. 1 and 2, they are not repeated here. The processing according to the second exemplary embodiment will be described with reference to the flowcharts in FIGS. 6 and 7.

FIG. 6 is a flowchart illustrating an example of the processing by the printer 20 according to the second exemplary embodiment.

The processing illustrated in the flowchart in FIG. 6 can be realized when the CPU 203 of the printer controller 200 of the printer 20 reads and executes the program computer-readably stored in the ROM 204.

In step S601, upon reception of the print job ID from the host computer 10 via the LAN 101 and the NC 208, the CPU 203 of the printer 20 stores the print job ID in the RAM 205, and then proceeds to step S602.

In step S602, in order to know the time period for ending the job corresponding to the above-described print job ID on the cloud server 30, the CPU 203 transmits a request packet for an ending time period (including above-described print job ID) to the cloud server 30 via the NC 208 and the LAN 101.

In step S603, the CPU 203 receives the information about the ending time period of the job from the cloud server 30 in the form of the response packet in response to the request packet for the ending time period described above via the LAN 101 and the NC 208, and stores the information in the RAM 205. Herein, it is assumed that "15 minutes" is received as the ending time period. A method in which the cloud server 30 calculates the ending time period is similar to that in the first exemplary embodiment.

In step S604, the CPU 203 compares a threshold value that has been previously set with the ending time period stored in the RAM 205 in step S606 described above, to determine whether the ending time period is larger than the threshold value (threshold value<ending time period). The threshold value is the same as that described in the first exemplary embodiment. Herein, as an example, the threshold value is assumed as "1 minute" for descriptions.

When, the ending time period is not larger than the threshold value (threshold value≥ending time period) (NO in step S604), the processing proceeds to step S609.

On the other hand, when the ending time period is larger than the threshold value (threshold value<ending time period) (YES in step S604), the processing proceeds to step S605.

According to the above-described example, since the ending time period (15 minutes) is larger than the threshold value (1 minute), the processing proceeds to step S605.

In step S605, the CPU 203 sets a sleep timer for the value of the ending time period of the job stored in the RAM 205 in step S603 described above. The sleep timer is the same as that in the first exemplary embodiment.

In step S606, the CPU 203 executes sleep shift processing, to start the sleep mode. At this time, the power supply of the printer 20 is reduced as much as possible to realize the power saving. The CPU 203 may notify the host computer 10 of the ending time period of the job before executing the sleep shifting processing. With this processing, the host computer 10 can display the ending time period of the job on a screen to notify the user of the ending time period.

In step S607, it is monitored whether the time period set for the sleep timer in the CPU 203 has elapsed. After the time period has elapsed, the processing proceeds to step S608.

In step S608, the CPU 203 returns from the sleep mode, and proceeds to step S609.

In step S609, the CPU 203 executes processing for transmitting to the cloud server 30 the request packet for editing data. More specifically, the CPU 203 first executes polling on the cloud server 30 via the NC 208 and the LAN 101 to confirm that the print job has been completed, and then the CPU 203 transmits the request packet for the editing data to the cloud server 30.

In step S610, the CPU 203 receives the editing data from the cloud server 30 via the LAN 101 and the NC 208 in the form of the response packet, stores the editing data in the RAM 205, and then proceeds to step S611.

In step S611, the CPU 203 transmits the editing data stored in the RAM 205 to the printer unit 201 via the printer I/F 206, and causes the printer unit 201 to perform the print processing. Subsequently, the processing of this flowchart is ended.

During the sleep corresponding to the ending time period of the job (hereinafter, referred to as a "first print job") in step S607 described above, when the printer 20 receives a new job (hereinafter, referred to as a "second job") by the NC 208, the CPU 203 returns from the sleep mode and stores the print job ID of the second print job in the RAM 303.

In addition, the CPU 203 controls the first print job to perform the processing in steps S602 to S611. In other words, the CPU 203 transmits to the cloud server 30 the request packet for the ending time period of the first print job to acquire the ending time period of the first print job again, and then receives the information about the ending time period of the first print job from the cloud server 30 again. When the CPU 203 determines that the threshold value is equal to or larger than the ending time period, the CPU 203 performs the processing in steps S609 to S611.

On the other hand, when the CPU 203 determines that the ending time period is larger than the threshold value, the CPU 203 sets the sleep timer for the value of the ending time period, and performs the sleep shift processing to start the sleep mode. After the ending time period has been elapsed, the CPU 203 returns from the sleep mode, and then executes the processing in steps S609 to S611. Upon the completion of the printing of the first print job in step S611, the CPU 203 controls the second print job to perform the processing in steps S602 to S611.

According to the descriptions above, the ending time period of the first print job is acquired again, but may not be acquired as described below.

When the second print job is received by the NC 208 during the sleep corresponding to the first print job, the CPU 203 returns from the sleep mode, and stores the print job ID of the second print job in the RAM 303. Further, the CPU 203 calculates the remaining time until the original ending time period of the first print job, and controls execution of the processing in steps S604 to S611 using the calculated remaining time as a new ending time period of the first print job. In step S611, upon the completion of the printing of the first print job, the CPU 203 controls the second print job to perform the processing in steps S602 to S611.

Furthermore, according to the above-described descriptions, when the job ID of the second print job is received by the NC 208 during the sleep corresponding to the first printing job, the CPU 203 returns from the sleep mode. However, when the second print job is received by the NC 208 during the sleep corresponding to the first print job, the NC 208 may store the job ID of the second print job in the RAM in the NC 208 not to return the CPU 203 on the way.

Moreover, after the ending time period has elapsed and the CPU 203 returns from the sleep mode, the NC 208 may transmit the job ID of the second print job stored in the RAM in the NC 208.

With the configuration described above, even when a print job ID of a new print job is received during the sleep, the printer 20 can realize the power saving. In addition, by transmitting the polling packet from the printer 20 to the cloud server 30 after the ending time period has elapsed, the load for communicating with the cloud server 30 can be reduced.

The processing at the cloud server 30 side will be described. FIG. 7 is a flowchart illustrating an example of the processing by the cloud server 30 according to the second exemplary embodiment.

The processing illustrated in the flowchart in FIG. 7 can be realized when the CPU 301 of the cloud server 30 reads and executes the program computer-readably stored in the HDD 305.

In step S700, upon the reception of the print job with the print job ID from the host computer 10 via the LAN 101 and the NC 304, the CPU 301 of the cloud server 30 stores the print job with the print job ID in the RAM 303 (or, HDD 305), and then proceeds to step S701. The print job stored in the RAM 303 (or, HDD 305) is managed by the job management unit 306 together with the print job ID, the number of pages, the processing type, and the estimated processing time.

In step S701, upon the reception of the request packet for the ending time period from the printer 20 via the network 102 and the NC 304, the CPU 301 proceeds to step S702.

In step S702, the CPU 301 analyzes the ending time period based on the number of jobs of the print job, the number of pages of the job, and the processing type of the job stored in the RAM 303 (or, HDD 305), and stores the analyzed ending time period in the RAM 303. A method for analyzing the ending time period is the same as that in the first exemplary embodiment.

In step S703, the CPU 301 transmits the ending time period stored in the RAM 303 to the printer 20 via the NC 304 and the network 102.

Upon the completion of the processing of the preceding job, in step S704, the CPU 301 causes the image processing unit 307 to perform the image processing on the job received in step S700 described above and managed by the job management unit 306, and then stores the image processing result (editing data) in the RAM 303 (or, HDD 305).

In step S705, the CPU 301 determines whether the editing data is requested from the printer 20 via the network 102. When the editing data is requested (YES in step S705), the processing proceeds to step S706.

In step S706, the CPU 301 reads the editing data corresponding to the job ID requested in step S705 described above from the RAM 303 (or, HDD 305), and transmits the editing data to the printer 20 via the network 102 and the NC 304. Subsequently, the processing of this flowchart is ended.

As described above, according to the present exemplary embodiment, even when the processing result is not returned at once from the cloud server 30, the image forming apparatus (printer 20) can shift to sleep, thereby reducing the consumption of the wasteful electric power. In addition, the image forming apparatus (printer 20) does not wastefully transmit the polling packet to the cloud server 30, thereby reducing the load for communicating with the cloud server 30.

The present invention also includes all combinations of the first exemplary embodiment and the second exemplary embodiment described above. In other words, the cloud server 30 may use both of the indirect usage method and the direct usage method as the utilization form of the cloud.

More specifically, the cloud server 30 performs the processing illustrated in FIG. 5 upon the reception of the job from the host computer, and then performs the processing illustrated in FIG. 7 upon the reception of the job from the image forming apparatus such as a printer. Further, the image forming apparatus such as a printer performs the processing illustrated in FIG. 4, upon reception of the print job ID with the print job from the host computer, and performs the processing illustrated in FIG. 6, upon the reception of the print job ID without a print job from the host computer.

As described above, both usage methods of the indirect usage method and the direct usage method can be used, and further, an image processing system realizing the power saving and the reduction of the communication load can be established.

As described above, the image processing system is described as an exemplary embodiment of the network system of the present invention. However, the network system of the present invention is not limited to the image processing system as described above.

For example, the processing of the job performed by the cloud server 30 is not limited to the processing of the print job. The cloud server 30 may perform processing of the job such as image processing other than the print job, and data processing including data analysis processing and statistic processing.

More specifically, the cloud server 30 receives the job with the job ID from the computer, the scanner, the printer, and other information processing apparatuses (hereinafter, collectively referred to as an "information processing apparatus"). Upon reception of the request for the ending time period from the information processing apparatus or other information processing apparatuses, the cloud server 30 performs the ending time period analysis and returns the ending time period to process the job. Further, upon reception of the data request from the information processing apparatus, the cloud server 30 returns the data on which the job has been processed. The information processing apparatus transmits the request for the ending time period to the cloud server 30, receives the ending time period, and then performs the sleep mode only during the ending time period. The information processing apparatus returns from sleep after the ending time period has elapsed, requests for the data from the cloud server 30, and then acquires the processed data.

As described above, according to the present exemplary embodiment, even when the processing result is not returned from the cloud server 30 at once, the information processing apparatus can shift to sleep, thereby reducing a consumption of wasteful electric power. In addition, since the information processing apparatus does not wastefully transmit a polling packet to the cloud server 30, a load for communicating with the cloud server 30 can be reduced.

The configurations of the various data described above and the contents thereof are not limited thereto, and various configurations and contents may be included depending on the usage and the purpose.

Some exemplary embodiments are described as above, and the present invention can also be applied to exemplary embodiments such as a system, an apparatus, a method, a program, and a storage medium. More specifically, the present invention may be applied to a system including a plurality of devices, and also a system including a single device.

Aspects of the present invention can also be realized by a computer of a system or apparatus (or devices such as a CPU or MPU) that reads out and executes a program recorded on a memory device (computer-readable medium) to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-024517 filed Feb. 8, 2011, which is hereby incorporated by reference herein in its entirety.

What is claimed is:

1. An image forming apparatus configured to communicate with an external apparatus via a network, the image forming apparatus comprising:
a reception unit configured to receive print data;
a transfer unit configured to transfer the received print data to the external apparatus;
an ending time reception unit configured to request information indicating an ending time at which processing of the print data executed by the external apparatus is estimated to be completed to the external apparatus and to receive the information from the external apparatus in response to the request;
a control unit configured to compare the ending time indicated by the information received by the ending time reception unit with a predetermined threshold value, and to, when the ending time is greater than the threshold value, shift the image forming apparatus to a power-saving state and then return the image forming apparatus from the power-saving state to a normal state after the ending time has elapsed;
a processed data reception unit configured to request processed data to the external apparatus after the ending time has elapsed and to receive the processed data returned from the external apparatus in response to the request,
wherein the processed data is data on which the processing of the print data is executed by the external apparatus; and
a printing unit configured to print the processed data.

2. The image forming apparatus according to claim 1, further comprising:
a determination unit configured to determine, depending on a type of the received print data, whether to perform processing on the print data by the image forming apparatus or transfer the print data to the external apparatus,
wherein the transfer unit transfers the print data to the external apparatus when the determination unit determines to transfer the print data to the external apparatus.

3. A method for controlling an image forming apparatus configured to communicate with an external apparatus via a network, the method comprising:
receiving print data;
transferring the received print data to the external apparatus;
requesting information indicating an ending time at which processing of the print data executed by the external apparatus is estimated to be completed from the external apparatus and receiving the information from the external apparatus in response to the request;
comparing the ending time indicated by the information received with a predetermined threshold value, and to, when the ending time is greater than the threshold value, shift the image forming apparatus to a power-saving state and then return the image forming apparatus from the power-saving state to a normal state after the ending time has elapsed;
requesting processed data to the external apparatus after the ending time has elapsed, and receiving the processed data returned from the external apparatus in response to the request,
wherein the processed data is data on which the processing of the print data is executed by the external apparatus; and
printing the processed data.

4. The image forming apparatus according to claim 1, wherein the processed data reception unit does not request processing data before the ending time elapses.

5. The image forming apparatus according to claim 1, wherein a time at which processing of transferred print data is estimated to be completed is calculated based on a number of pages of print data.

6. The image forming apparatus according to claim 1, wherein a time at which processing of transferred print data is estimated to be completed is calculated based on a type of the processing.

7. The image forming apparatus according to claim 1, wherein processing of transferred print data executed by the external apparatus is copy-forgery-inhibited pattern processing or optical character recognition (OCR) processing.

8. The image forming apparatus according to claim 1, wherein the reception unit receives print data from a host computer, and the transfer unit transfers print data received from the host computer to a cloud server serving as the external apparatus.

9. The image forming apparatus according to claim 1, wherein, in a case where the reception unit receives new print data during when the image forming apparatus is in the power-saving state, the control unit returns the image forming apparatus from the power-saving state, and the transfer unit transfers the new print data to the external apparatus, and the cloud unit shifts the image forming apparatus to the power-saving state for a remaining time of the ending time indicated by the information received by the ending time reception unit.

* * * * *